United States Patent [19]

Stevens

[11] 4,348,033

[45] Sep. 7, 1982

[54] BOBSLED

[76] Inventor: David B. Stevens, 36324 S. Beach Rd., Oconomowoc Lake, Wis. 53066

[21] Appl. No.: 179,012

[22] Filed: Aug. 18, 1980

[30] Foreign Application Priority Data

Aug. 29, 1979 [GB] United Kingdom ................ 7929979

[51] Int. Cl.³ ............................................ B62B 13/08
[52] U.S. Cl. ..................................... 280/16; 280/91
[58] Field of Search .................. 280/16, 17, 15, 21 R, 280/21 A, 91, 99; 180/182, 183

[56] References Cited

U.S. PATENT DOCUMENTS

| | | | |
|---|---|---|---|
| 1,546,805 | 7/1925 | St. Pierre | 280/16 |
| 1,618,094 | 2/1927 | King | 280/99 |
| 2,276,310 | 3/1942 | James | 180/182 |
| 2,440,785 | 5/1948 | Porter | 280/16 X |
| 2,442,918 | 6/1948 | Caughrean | 280/15 |
| 2,592,116 | 4/1952 | Caughrean | 280/15 |
| 3,055,675 | 9/1962 | Brecko et al. | 280/91 |
| 3,057,633 | 10/1962 | Brousseau | 280/16 |
| 3,392,987 | 7/1968 | Muller et al. | 280/91 |

FOREIGN PATENT DOCUMENTS

| | | | |
|---|---|---|---|
| 462437 | 1/1950 | Canada | 280/91 |
| 516128 | 1/1931 | Fed. Rep. of Germany | 280/99 |
| 1513533 | 1/1968 | France | |
| 1566429 | 3/1969 | France | |
| 2166466 | 8/1973 | France | |
| 165004 | 1/1934 | Switzerland | |

*Primary Examiner*—Joseph F. Peters, Jr.
*Assistant Examiner*—Milton L. Smith
*Attorney, Agent, or Firm*—Quarles & Brady

[57] ABSTRACT

A bobsled (10) provides steering control for all four of its runner assemblies (22 and 23). The left runner assemblies (22 and 23) are coupled through tie rods (55 and 56) to the right runner assemblies (22 and 23), and these assemblies (22 and 23) are coupled through a steering linkage (31, 36-42, 45, 46, and 49-54) and cables (62 and 66) to a push-pull pair of control levers (57 and 58). Operation of the levers (57 and 58) moves the linkage axially to pivot front and rear bell cranks (45 and 46) counter to one another, resulting in the rear runner assemblies (23) being pivoted counter to the front runner assemblies (22) to follow an arcuate track through a turn. The steering system extends through the front and rear axles (68 and 69) which are coupled to the frame (12) through a suspension system and which are allowed to pivot in planes transverse to longitudinal axis of the bobsled (10).

8 Claims, 8 Drawing Figures

BOBSLED

TECHNICAL FIELD

The field of the invention is vehicles of the type mounted on runners and used for carrying people and loads over ice and snow, and more particularly, racing sleds of the type used in international competition.

BACKGROUND ART

In recent years, many bobsleds used in international competition have been manufactured in Italy. Bobsled teams from other countries have found it convenient to purchase these bobsleds and make aerodynamic and engineering changes, rather than to engage in the development of an entirely new bobsled. An exception to this approach was exemplified by the East German sleds that were used in the 1980 Olympic competition. The success of the East Germans was due to technological improvements, including better aerodynamic design and an independent suspension, coupled with superior driver skills. Other developments in bobsled technology have been provided in the area of the runners. There has not been, however, comparable development of the steering and control system which melds the driver to his sled. Generally, bobsleds have included controls for the front runners only, with the brakeman being required to skid or jump the rear end of the sled laterally in the turns to direct the rear runners in following the general path of the front runners. The physical connections to the front runners have been made through a pair of hand ropes, one being held in the right hand of the driver and the other being held in the left hand. The front runners have been mounted on an H-shaped frame that is supported at its geometrical center to pivot right or left in the horizontal plane, as well as up and down in a plane transverse to the longitudinal axis of the sled. The rear runners have also been connected to an H-shaped frame supported at its geometrical center, however, this frame has not been connected to the steering ropes.

With such a control system, the rear runners may skid or edge causing loss of speed. Nor is it possible to reach, or approach, an ideal steering position wherein the rear runners track on a thin film of water left by the track of the front runners. With a steering system such as described, it is possible that one of the hand ropes could be dropped during a run, and would then be very difficult to retrieve.

DISCLOSURE OF THE INVENTION

The invention relates to a steering and control system through which a driver can control and direct both the front and rear runners of his bobsled.

In its broadest aspects, the invention concerns a steering linkage through which a pair of rear runner assemblies are pivoted counter to the front runner assemblies in a turning maneuver. The invention is enhanced by two further improvements: first, a pair of lever type controls, sometimes referred to as "joy sticks," which are located directly ahead of the driver's seat for actuating the steering linkage to effect the simultaneous steering of the front and rear runners; and second, a suspension system on the sled that is built compactly around the four-runner steering system to improve the handling characteristics of the sled.

As expressed in its broadest aspect, the invention more particularly includes a frame formed along a longitudinal axis, a front and a rear axle carried by the frame transverse to its longitudinal axis, two laterally spaced front runner assemblies pivotally connected to the front axle on opposite sides of the longitudinal axis of the frame, and two laterally spaced rear runner assemblies pivotally connected to the rear axle on opposite sides of the longitudinal axis of the frame. A front link is pivotally connected at its opposite ends to opposite front runner assemblies. A front steering motion translator is pivotally mounted on one side of the longitudinal axis of the frame, has a radial portion extending forward of its pivot and has a second radial portion extending laterally from its pivot toward the longitudinal axis. Means are provided for connecting the forwardly extending radial portion of the front steering motion translator to one of the runner assemblies.

Similarly, a rear link extends between and is pivotally connected at its opposite ends to opposite rear runner assemblies, and a rear steering motion translator is pivotally mounted on the frame, however, on the opposite side of the longitudinal axis from the front steering motion translator. The rear steering motion translator has a first radial portion extending rearwardly from its pivot and has a second radial portion extending laterally from its pivot toward the longitudinal axis. Means are provided for connecting the rearwardly extending radial portion of the rear steering motion translator to one of the rear runner assemblies.

A steering linkage is carried longitudinally by the frame and connects the laterally extending radial portion of the front steering motion translator to the laterally extending radial portion of the rear steering motion translator. Finally, manually operable steering control means are coupled to the steering linkage for axial movement of the linkage to pivot the front and rear steering motion translators in opposite rotational directions, so that the rear runner assemblies are pivoted counter to the front runner assemblies in a turning maneuver.

There is a separate upright joy stick for actuating the steering linkage in each respective axial direction. When the driver pulls on one joy stick with his right hand to turn right, the front runners will be pivoted to the right and the rear runners will be pivoted to point left to trace an arc through the turn. Still further, the joy stick in the left hand of the driver will be moved forward with the driver's left hand to provide a feeling of rotation towards the right side of the sled.

The steering linkage extends through openings around which the axles are pivotally mounted for limited movement in planes transverse to the longitudinal axis of the sled. These pivotal connections are formed by annular flanges on the axles which extend around the openings and fit within larger openings in respective collars. The axles are coupled through springs to the runner assemblies, and the response of the springs to bumps in the bob run is damped by damping members which bear against the axles to complete the suspension system. These damping members may be mounted to the frame to bear against the axles directly and also may be mounted in collar guide members to contact the collars and indirectly control the movement of the axles.

One construction of a bobsled embodying this invention is illustrated by way of example, in the accompanying drawings.

BEST MODE OF CARRYING OUT THE INVENTION

Figure 1:
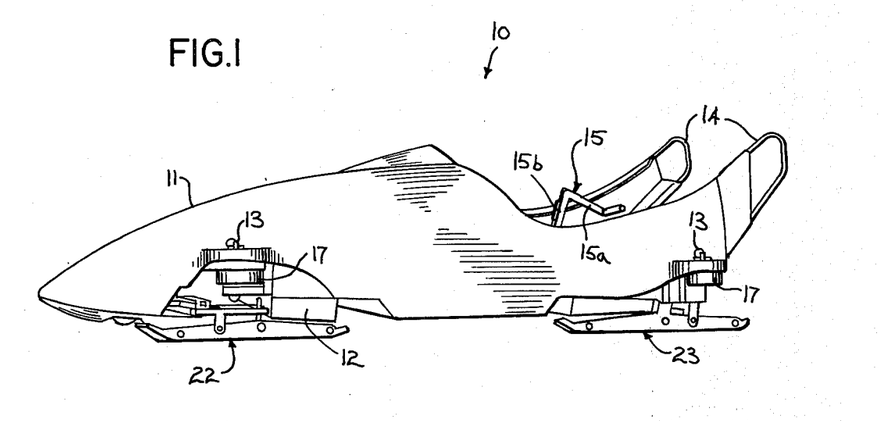
FIG. 1 is a perspective view of a bobsled that embodies the present invention.
Figures 2, 8:
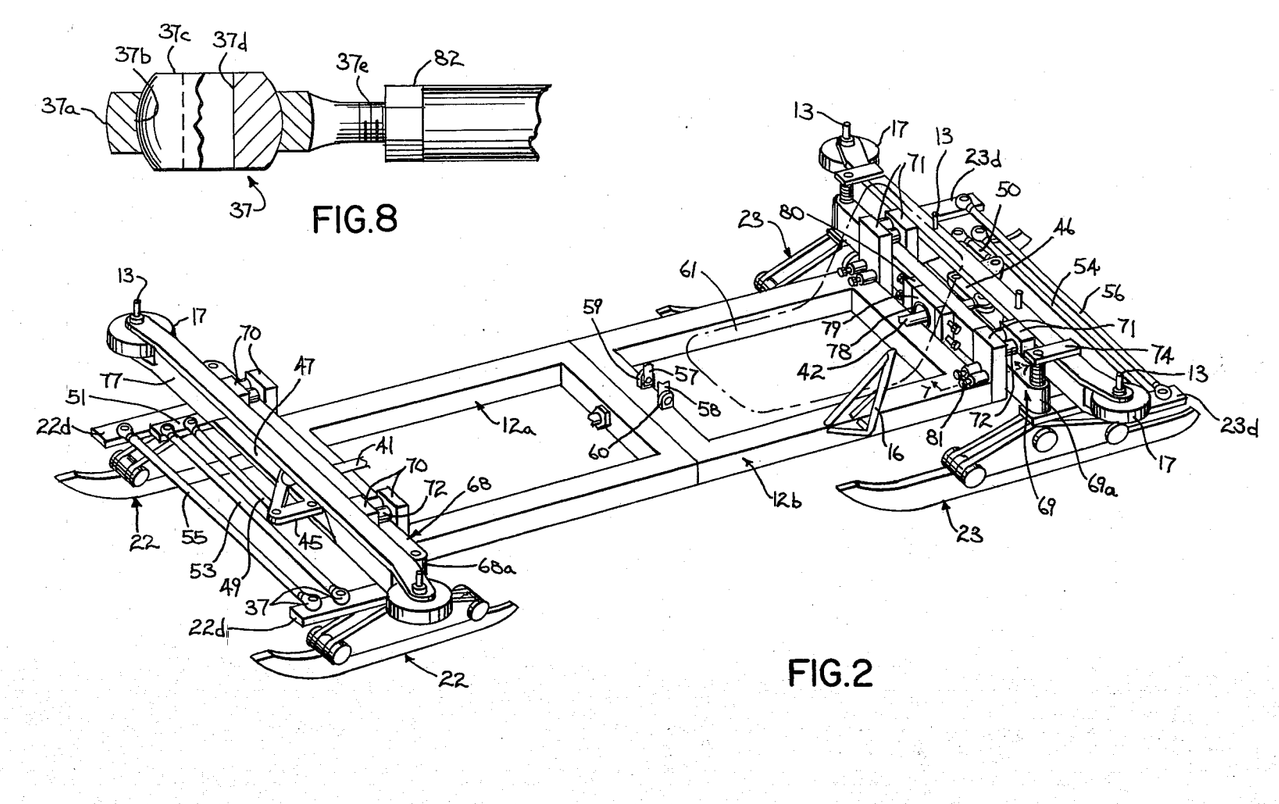
FIG. 2 is a perspective view of the bobsled of FIG. 1 without the body and steering actuation components to permit better viewing of the frame and suspension.
FIG. 8 is a side view in elevation of one of the spherical cam joints in FIG. 3.

Referring to FIG. 1, a bobsled 10 that embodies the present invention has a fiberglass body 11 of sleek, aerodynamic design. The body 11 is mounted on a frame 12 seen in FIG. 2 and is held down on the front and rear of the frame 12 and the members supported therein, as seen in FIGS. 1 and 2, by pin-style fasteners 13 of the type used to hold down the hoods of automobiles. Referring specifically to FIG. 1, the body 11 is formed around a pair of handles 14, which are located at the rear of the bobsled 10, and which are gripped by the members of the bobsled team to rock the bobsled 10 back and forth prior to a run down the course. A pusher bar 15 is seen in its raised position, where its arm 15a extends outside the left side of the body 11 when the sled 10 is pushed to start a run. The pusher bar 15 also has a shaft 15b that is telescoped into a sleeve 16 mounted on a rear frame section 12b as seen in FIG. 2. The pusher bar 15 is rotated into a position where it can slide down into the sleeve 16 and inside the left side of the body 11 after the start has been accomplished.

A portion of the body has been cut away in FIG. 1 to show two plastic discs 17 that are rotatably supported on the frame and which protrude from the edges of the body 11 to protect the front and rear ends of the sled from bumping the sidewall along a bobsled course. Two more of these discs 17 are located on the other side of the sled 10 as well, as seen in FIG. 2. When a run has been completed, the sled is braked with a mechanism seen in FIG. 6. The brake mechanism includes a brake lever 18 pivotally mounted on the rear frame section 12b and connected through a cable 19 and pulley 20 to a pivotable brake spud 21 that digs into the ice to prevent the sled 10 from sliding backward.

Figures 3, 7:
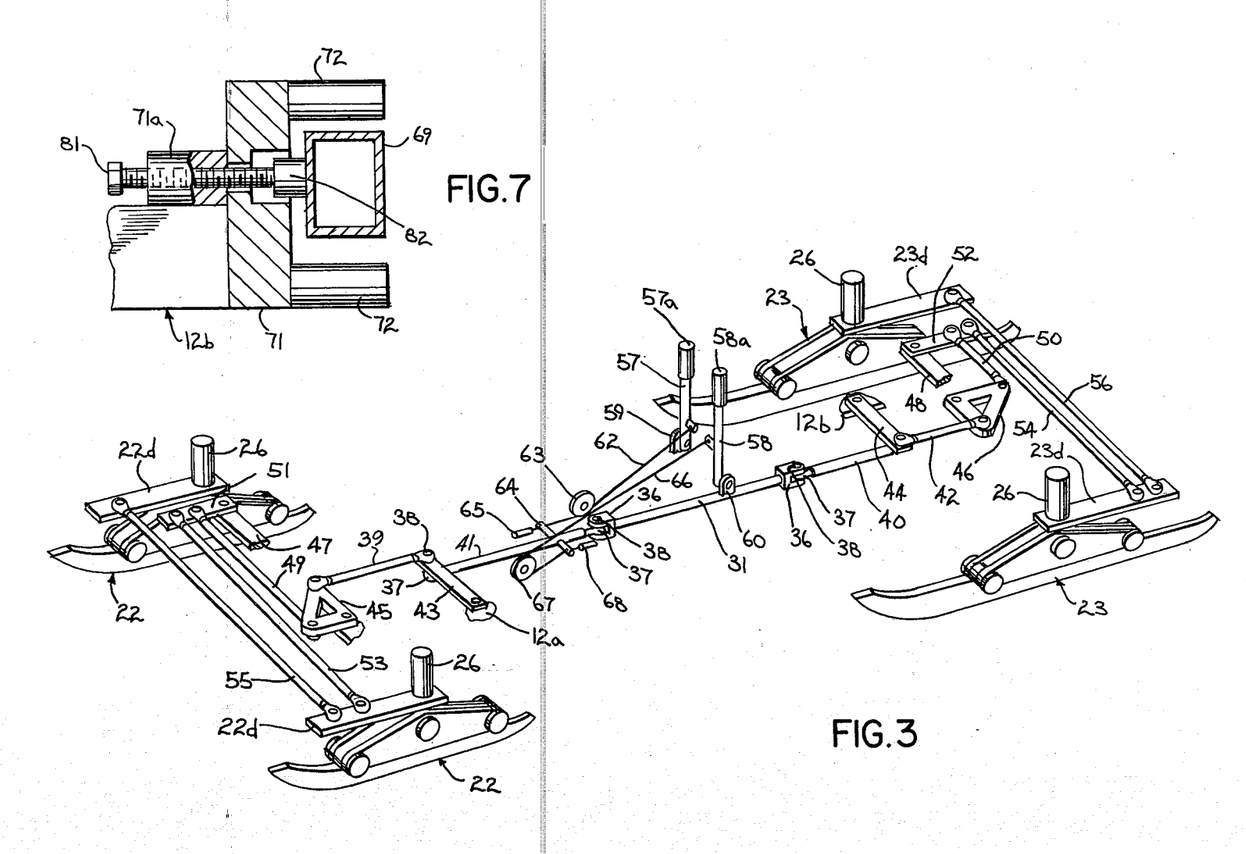
FIG. 3 is a diagrammatic view in perspective that illustrates the steering and control system in the bobsled of FIG. 1.
FIG. 7 is a sectional view showing one of the damper mechanisms as seen in the plane indicated by line 7—7 in FIG. 2.
Figure 6:
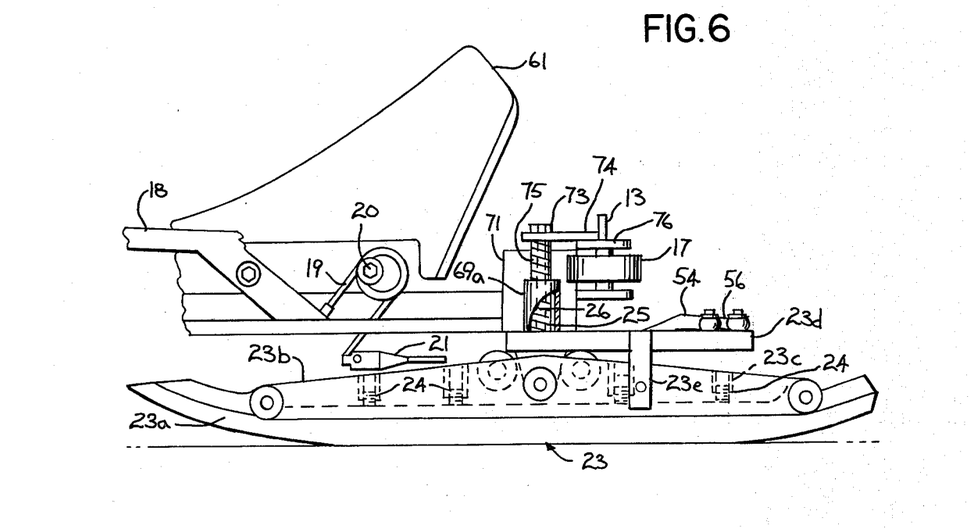
FIG. 6 is a detail side view in elevation of a runner assembly of the bobsled of FIG. 1.

As seen in FIGS. 2 and 3, the frame 12 is carried on two front runner assemblies 22 and two rear runner assemblies 23. As seen in FIG. 6, each runner assembly carries a flexible runner blade 23a with a web that is pivotally connected to a runner support 23b just behind the forward tip and just in front of the rear tip of the runner blade 23a. The runner support 23b has two laterally spaced side flanges joined by four webs 23c in which threaded holes are formed to receive set screws 24. The set screws 24 bear against the runner blade 23a, holding it in a more arcuate position as they are projected further out of the blade support 23b, and allowing the runner blade 23a to assume a flatter position when withdrawn into the blade support 23b. The amount of blade 23a that contacts the ice is determined by the flatness or the roundness of blade position and is important to the performance of the bobsled.

Still referring to FIG. 6, runner blade 23b is pivotally connected to a runner pivot arm 23d along an axis transverse to the longitudinal axis of the bobsled 10 to allow the runner assembly 23 to rock forward and backward against a spring 25 as the sled 10 goes over bumps. The runner blade support 23b is also connected to the pivot arm 23 at a distance from the kingpin 26, as shown by the fixed, vertical link plate 23e so that the runner assembly 23 is pivoted as a unit as the arm 23d is pivoted around the kingpin 26. The forward runner assemblies 22 of FIGS. 1–3 are constructed the same as the rear runner assemblies 23 just described, except that their pivot arms 22d extend forward from their respective kingpins 26 rather than rearwardly as do the pivot arms 23d of the rear runner assemblies 23.

Figure 4:
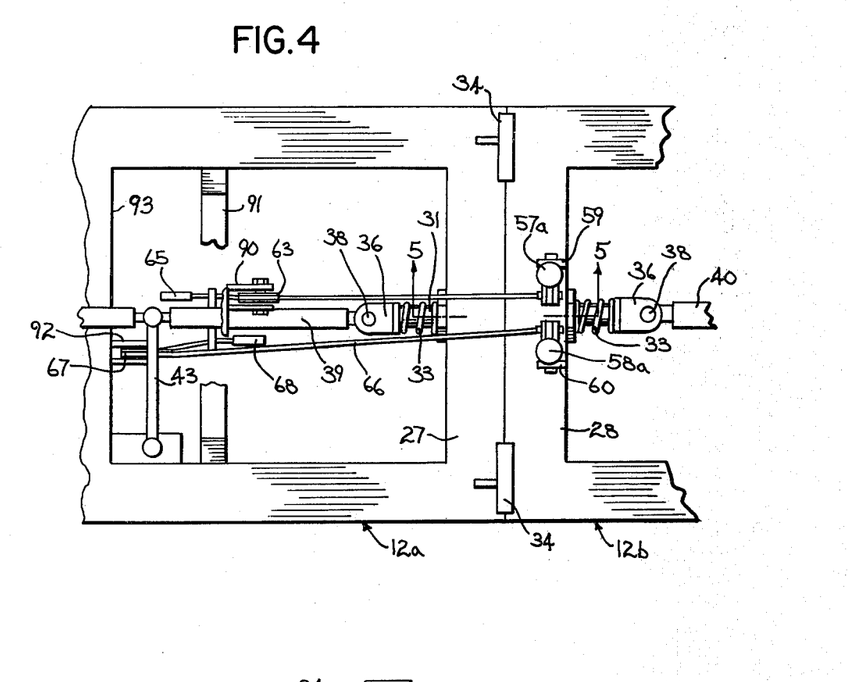
FIG. 4 is a top fragmentary view showing the center section of the frame and steering control system of the bobsled of FIG. 1.
Figure 5:
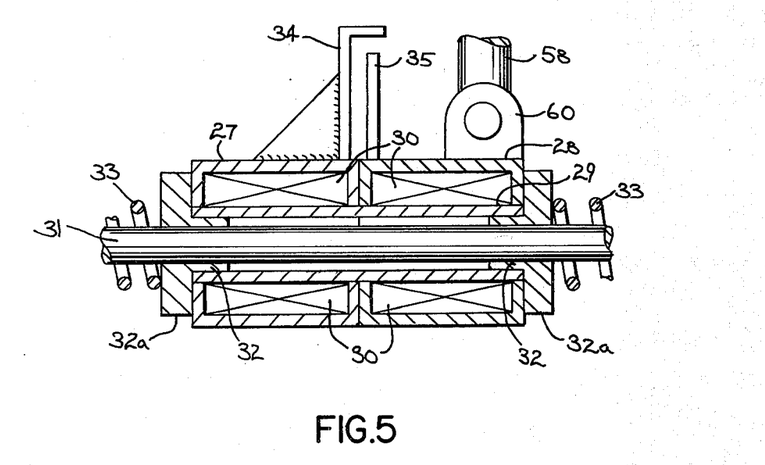
FIG. 5 is a sectional view taken in the plane indicated by line 5—5 in FIG. 4.

Referring to FIG. 2, where a belly pan (not shown) and the body 11 have been removed, the front and rear rectangular sections 12a and 12b of the frame are formed of either box steel or channel steel members welded together, the style of members in the two sections 12a and 12b being optional depending on design considerations such as weight and balance. Referring to FIGS. 4 and 5, the front and rear frame sections 12a and 12b are articulately connected for independent swiveling motion around a central longitudinal axis. The center cross members 27 and 28 of the frame sections 12a and 12b rotate around a sleeve 29 on bearings 30 disposed in hollow portions of the members 27 and 28 and encircling the sleeve 29. The sleeve 29 extends through a bore along the longitudinal axis of the bobsled 10. A center-link steering actuator shaft 31 is carried in the bore of the sleeve 29 by a pair of bronze bushings 32. The bushings 32 include flanges 32a which are held against appropriate outside surfaces of the cross members 28 and 29 by springs 33 carried by the steering actuator shaft 31.

The angular articulation of the frame sections 12a and 12b is limited by the further structure seen in FIG. 5. A plate 34 of L-shaped cross section with a triangular supporting flange is welded to the central cross member 37 of the front frame section 12a. This plate 34 forms a stop for an upright plate 35 which includes a triangular support flange and which is welded to the central cross member 29 of the rear frame section 12b. The vertical movement of the plate 35 is restricted by the stop plate 34 to limit the angular displacement of the rear frame section 12b to ten degrees of rotation from the plane of the front section 12a.

As seen in FIG. 3, the center-link steering actuator shaft 31 is coupled at its forward end to a first intermediate actuator link 39 and at its rear end to a second intermediate actuator link 40. Referring also to FIG. 4, each of these connections is made through a clevis 36 and a spherical ball joint 37, which are coupled by a pin 38. The steering linkage in FIG. 3 contains at least twenty of these joints 37, which provide limited pivotal movement of the pins 38 coupling the rigid members. The spherical ball joints 37 provide the steering linkage with the flexibility necessary to adjust to the articulated movement of the frame sections 12a and 12b, as well as to the movements of the runner assemblies 22 and 23 in a plane of rotation transverse to the longitudinal axis of the bobsled 10.

The intermediate actuator links 39 and 40 are connected to front and rear actuator links 41 and 42, respectively, through pins 38 which couple the front pair of links 39 and 41 and rear pair of links 40 and 42 to respective idler arms 43 and 44. The front idler arm 43 is pivotally mounted on the front frame section 12a to the left side of the actuator linkage and extends to pivotal connection between a top joint 37 on the front link 41 and a bottom joint 37 on the connecting intermediate link 39. The rear idler arm 44 is pivotally mounted on the rear frame section 12b and extends to a similar connection to the rear actuator link 42 and its connecting intermediate link 40. The idler arms 43 and 44 assist in maintaining the axial position of links 39–42 when the steering linkage is subjected to torsional forces.

Front and rear bell cranks 45 and 46 are pivotally mounted on opposite sides of the axially disposed actuator linkage and each have a portion that extends from its pivot to connect to a spherical ball joint 37 at one end of the actuator linkage. The bell cranks 45 and 46 are mounted on cross bars 47 and 48 and positioned to the front and rear of the frame 12. A radial portion extending forwardly from the pivot of front bell crank 45 and a radial portion extending rearwardly from the pivot of the rear bell crank 46 connect through spherical ball joints 37 to a pair of first tie rods 49 and 50. The bell cranks 45 and 46 are rotated to translate linear motion along the longitudinal axis of the frame 12 into linear motion transverse and generally perpendicular to this axis. The first tie rods 49 and 50 at both the front and rear of the sled are connected through spherical ball joints 37 to reaction arms 51 and 52, which are pivotally mounted on the cross bars 47 and 48 just inside the right runner assemblies 22 and 23. Second tie rods 53 and 54 at the front and rear link the reaction arms 51 and 52 to respective pivot arms 22d and 23d on the left runner assemblies 22 and 23. Third tie rods 55 and 56 at the front and rear link the pivot arms 22d and 23d of each respective pair of runner assemblies 22 and 23, all of these connections being made through spherical ball joints 37.

Still referring to FIG. 3, when the actuator linkage is moved rearwardly the front bell crank 45 will pivot clockwise and will pivot the front runner assemblies 22 in a clockwise direction as well. At the same time, the rear bell crank 46 will pivot counterclockwise, thereby pivoting the rear runner assemblies 23 counterclockwise about their kingpins 26. If the actuator linkage is moved in a forward direction, the forward runner assemblies 22 will pivot in the counterclockwise direction and the rear runner assemblies will pivot in a clockwise direction. This provides for the positioning of the runner assemblies 22 and 23 for an arcuate sweep in turning maneuvers, where the rear runner blades 23a will travel at least partially in the fresh tracks made by the front runner blades 22a. The rear runner blades 23a may then take advantage of the thin film of water created by the passing of the front runner blades 22a to reduce friction and maintain or increase speed down the run.

As seen in FIG. 3, the axial movement of the actuator linkage is controlled through a pair of control levers 57 and 58 pivotally mounted on brackets 59 and 60, which are positioned just forward of the seat 61 (in phantom in FIG. 2) for the driver and brakeman. Each of the control levers 57 and 58 has a bicycle grip 57a and 58a on its uppermost end. A cable 62 is strung from a connection that is an appreciable radial distance from the pivot of the right-hand lever 57. The cable 62 is strung over a pulley 63, which maintains the alignment of the cable 62 between the lever 57 and an end of a stub shaft 64 that extends transversely through the intermediate actuator link 39. The cable 62 slides through a hole (not seen) in the right end of the shaft 64 and has an anchoring sleeve 65 on its free end to engage the stub shaft 64 when the right-hand lever 57 is pulled. A second cable 66 is similarly connected to the left-hand lever 58 but is then strung over a reversing pulley 67 and passes through the stub shaft 64 from the front, the cable 66 having an anchoring sleeve 68 attached just behind the stub shaft 64. As seen in FIG. 4, the first pulley 63 is mounted by a bracket 90 on an intermediate cross member 92 of the front frame section 12a. The second pulley 67 is mounted on a bracket on the front cross member 93 of the front frame section 12a.

With the control levers 57 and 58 connected as described above, the pivoting or pulling of the right-hand control lever 57 towards the rear of the sled 10 will move the actuator linkage axially rearward. The pivoting or pulling of the left-hand control lever towards the rear of the sled 10 will move the actuator linkage axially forward due to the reversing connection through pulley 66. When one of the levers 57 or 58, or "joy sticks" as they are sometimes called, is pulled, the movement of the actuator linkage will tend to pivot the other lever 57 or 58 forward, thereby providing a push-pull mode of operation. This push-pull operation further provides a feel of rotation to the driver which corresponds to the direction of rotation of the front runner assemblies 22.

The control levers 57 and 58 must be pulled against the operating forces provided by the springs 33 encircling the center link shaft 31 in FIG. 4. The purpose of these springs 33 is to bring the actuator linkage back to a "neutral" position where the runner assemblies 22 and 23 are pointed straight ahead and parallel to the longitudinal axis of the sled 10. The bobsled 10 will find a path down the course if the runners are allowed to maintain the straight ahead position. The purpose of steering control is to allow the driver to take a faster path down the course, albeit a riskier one. If the driver's grip on the levers 59 and 60 is momentarily lost during a run, the control levers 59 and 60 are much easier to regrasp than the steering ropes of prior bobsleds. And, the spring return of the steering linkage to a "neutral" position will bring the control levers 59 and 60 to an upright position where they can be regrasped.

The handling of the bobsled 10 is enhanced by the provision of a suspension system carried by the frame 12 and built around the steering and control system. As seen in FIG. 2, front and rear axles 68 and 69 are carried between pairs of axle guide plates 70 and 71, each axle 69 being positioned in spaces between the guide plates 70 and 71 to move upward and downward. The guide plates 70 and 71 are mounted on opposite ends of the frame 12 and provide support for the cross bars 47 and 48 on which the bell cranks 45 and 46 are mounted. Cylindrical bumpers 72 of elastomeric material bridge the space between the guide plates 70 and 71 to cushion and limit the upward movement of the axles 68 and 69. Similar bumpers 72 may be provided across the bottom of the axles 68 and 69 to cushion return downward movement. The axles 68 and 69 form cylindrical spring housings 68a and 69a at their ends, where springs 25 are received as seen in FIG. 6. The kingpins 26 extend through the center of the springs 25 and through the top of the housings 68a, where they are secured with locknuts 73 on the front axle 68. As seen in FIG. 6, the rear axle 69 has double the springing of the front axle 68, due to a 2:1 weight ratio between the load on the rear axle 69 and the load on the front axle 68. Additional springs 75 are mounted on top of the rear spring housings 69a and the rear kingpins 26 are extended through the housings 69a and hold down bars 74 and are fastened with locknuts 73. The hold-down bars 74 are mounted on a rear cross beam 76, which in turn is mounted on the rear cross bar and axle guide plates 71. A front cross beam 77 is similarly mounted on the front cross bar 47 and axle guide plates 70. The cross beams 76 and 77 carry the plastic discs 17 described above as well as the shank portions of the pin-style fasteners 13 for holding down the body 11 on the frame 12. These beams 76 and 77 each have a top flange, two webs on opposite sides of an opening for the actuator linkage, and two bottom flanges joined to the top flange by the webs.

Still referring to FIG. 2, the axles 68 and 69 are formed with annular flanges 78 that encircle openings in the axles 68 and 69 along the longitudinal axis of the sled 10, through which the front and rear actuator links extend. Rectangular collars 79 with circular openings are mounted on the circular flanges 78 and slide up and down between collar guide members 80 mounted to the extremities of the front and rear frame sections 12 and 12b. Damping is provided by pins 81 that are disposed in bores extending first through bosses 71a and then through the guide plates 70 and 71 and the collar guide members 80. The heads 82 on these pins 81, as seen in FIG. 8, have a coating of polytetrafluoroethylene and bear on the axles and on the sides of the collars to damp the response of the axles 68 and 69 to the action of the springs 25 and 75. Other suitable coatings may be provided on the heads 81 to reduce friction.

The result of this construction is that the axles 68 and 69 move vertically up and down as well as rotating about their annular flanges 78 up to a limit of ten degrees in a plane transverse to the sled axis. The spherical ball joints 37 provide for sufficient flexibility in the steering linkage to accommodate this movement. As seen in FIG. 8, each joint 37 includes a head 37a in which a race 37b is formed to receive a spherical ball 37c. The ball 37c has a bore for receiving a pin (not shown in FIG. 2) that pivots to a limit defined by the head 37a. The head 37a extends from a threaded shaft 37e that is screwed into a threaded bore in one end of the rigid member. Small adjusting nuts 82 are positioned on the threaded shaft 37e between the head 37a and the rigid member, so that linkage may be adjusted after the coupling pins are inserted. One particular joint suitable for this purpose is referred to as a Hime joint. Performance of the steering linkage is improved if diametrical clearance between the ball 37c and the race 37b is nearly zero, which can be accomplished where one or more sliding surfaces are coated with polytetrafluoroethylene or other friction-reducing material with similar properties.

What has been described is a bobsled having a steering system for controlling both front and rear runners on a bobsled. A push-pull pair of joy sticks are provided to actuate this steering system and a suspension has been built around the steering system. Since many sleds might be designed incorporating the invention in different ways, and the above description has been by way of illustration, the scope of the invention shall be defined by the following claims.

The embodiments of the invention in which an exclusive property or privilege is claimed are defined as follows:

1. A bobsled which comprises:
    a frame formed along a longitudinal axis;
    a front axle and a rear axle carried by the frame transverse to its longitudinal axis;
    two laterally spaced front runner assemblies pivotally connected to the front axle on opposite sides of the longitudinal axis of the frame;
    two laterally spaced rear runner assemblies pivotally connected to the rear axle on opposite sides of the longitudinal axis of the frame;
    a front link pivotally connected at its opposite ends to opposite front runner assemblies;
    a front steering motion translator pivotally mounted on one side of the longitudinal axis of the frame, the steering motion translator having a first radial portion extending forward of its pivot and having a second radial portion extending laterally from its pivot towards the longitudinal axis;
    means connecting the forwardly extending radial portion of the front steering motion translator to one of the front runner assemblies;
    a rear link pivotally connected at its opposite ends to opposite rear runner assemblies;
    a rear steering motion translator pivotally mounted on the opposite side of the longitudinal axis of the frame from the pivot of the front steering motion translator, the rear steering motion translator having a first radial portion extending rearwardly from its pivot and having a second radial portion extending laterally from its pivot towards the longitudinal axis;
    means for connecting the rearwardly extending radial portion of the rear steering motion translator to one of the rear runner assemblies;
    a steering linkage carried longitudinally by the frame and connecting the laterally extending radial portion of the front steering motion translator to the laterally extending radial portion of the rear steering motion translator; and
    manually operable steering control means coupled to the steering linkage for axial movement of the linkage to pivot the front and rear steering motion translators in opposite rotational directions, so that the rear runner assemblies are pivoted counter to the front runner assemblies in a turning maneuver.

2. The bobsled of claim 1, wherein the steering control means includes a pair of control levers pivotally mounted on the frame, one control lever having an arm that is connected through a reversing device, and through a coupled connection to the steering linkage, to an arm of the other control lever, to impart axial movement to the steering linkage in response to a push-pull operation of the lever pair.

3. The bobsled of claim 1, wherein the steering linkage includes:
    a sleeve disposed longitudinally on the frame; a control shaft mounted for axial movement through the sleeve;
    a front actuator linkage connecting a front end of the control shaft to a traveling end of the laterally extending radial portion of the front steering motion translator, the front actuator linkage including the coupled connection to the steering control means;

a front idler arm connecting the front actuator linkage to the frame;

a rear actuator linkage connecting a rear end of the control shaft to a traveling end of the laterally extending radial portion of the rear steering motion translator; and a rear idler arm connecting the rear actuator linkage to the frame, whereby the idler arms resist torsional forces applied to an actuator linkage.

4. The bobsled of claim 1, wherein the means connecting the front steering motion translator to one of the front runner assemblies includes a second front link extending from the front steering motion translator to a pivotal connection on the opposite side of the longitudinal axis, and further includes a third front link pivotally coupled to the second front link and extending to the opposite side of the longitudinal axis to be pivotally connected to one of the front runner assemblies; and wherein the means connecting the rear steering motion translator to one of the rear runner assemblies includes a second rear link extending from the rear steering motion translator and away from the longitudinal axis to a pivotal connection to the frame, and further includes a third rear link pivotally coupled to the second rear link and extending to the opposite side of the longitudinal axis to pivotally connect to one of the rear runner assemblies.

5. The bobsled of claim 1 wherein the pivotal connections of the front and rear links are made through spherical ball joints located on the ends of the links and coupled through pins to the runner assemblies to allow twisting movement of the links relative to the runner assemblies.

6. The bobsled of claim 1, wherein:

the front and rear runner assemblies are each coupled through a spring to one of the ends of the respective axle connected to the runner assembly;

wherein the front and rear axles are each carried between at least one pair of upright guide members mounted on a respective end of the frame; and wherein the steering linkage extends through the front and rear axles; and wherein the front and rear axles are each further coupled to the frame through a sliding pivot disposed intermediate the opposite ends of the respective axle, so that the axles are pivotable around the steering linkage in a plane transverse to the longitudinal axis of the bobsled.

7. The bobsled of claim 6, wherein p1 each axle is formed with an annular flange extending around the axis of the sled, each flange defining the extension of an opening through the axle, the steering linkage extending through these openings;

further comprising a pair of collars each mounted on a respective flange; and further comprising damping members mounted to the frame, each damping member having a head that engages the collar to control the upward and downward movement of the axle in response to the action of the springs.

8. The bobsled of claim 1, wherein the frame includes front and rear frame sections and further comprising a pair of idler arms each pivotally connected at one end to the steering linkage, one idler arm extending on one side of the steering linkage to connect to the front frame section, and the other idler arm extending to the other side of the steering linkage to the rear frame section to support the steering linkage along the longitudinal axis of the bobsled and to oppose torsional forces exerted on the steering linkage.

* * * * *

UNITED STATES PATENT AND TRADEMARK OFFICE
CERTIFICATE OF CORRECTION

PATENT NO. : 4,348,033
DATED : September 7, 1982
INVENTOR(S) : David B. Stevens

It is certified that error appears in the above—identified patent and that said Letters Patent is hereby corrected as shown below:

Column 4, line 48  -  "member 37" should be --member 27--

Column 10, line 15 -  "pl" should be omitted

*Signed and Sealed this*

*Twenty-sixth* Day of *April 1983*

[SEAL]

Attest:

GERALD J. MOSSINGHOFF

*Attesting Officer*     *Commissioner of Patents and Trademarks*